(12) United States Patent
Storm

(10) Patent No.: US 7,136,777 B2
(45) Date of Patent: Nov. 14, 2006

(54) CORIOLIS MASS FLOWMETER AND METHOD FOR OPERATING A CORIOLIS MASS FLOWMETER

(75) Inventor: Ralf Storm, Essen (DE)

(73) Assignee: Krohne A.G., Basel (CH)

( * ) Notice: Subject to any disclaimer, the term of this patent is extended or adjusted under 35 U.S.C. 154(b) by 0 days.

(21) Appl. No.: 10/884,931

(22) Filed: Jul. 6, 2004

(65) Prior Publication Data
US 2005/0011286 A1 Jan. 20, 2005

(30) Foreign Application Priority Data
Jul. 9, 2003 (DE) .............................. 103 31 126

(51) Int. Cl.
*G06F 19/00* (2006.01)
(52) U.S. Cl. ...................... 702/182; 702/175; 702/137; 73/504; 73/861.355
(58) Field of Classification Search ................ 702/182, 702/175, 137, 189; 73/504, 861.354, 861.357, 73/861.355
See application file for complete search history.

(56) References Cited

U.S. PATENT DOCUMENTS

| 4,843,890 | A |   | 7/1989 | Samson et al. |   |
|---|---|---|---|---|---|
| 5,687,100 | A | * | 11/1997 | Buttler et al. | 702/137 |
| 5,804,742 | A | * | 9/1998 | Rademacher-Dubbick | 73/861.357 |
| 6,230,104 | B1 |   | 5/2001 | Shelley et al. |   |
| 6,513,393 | B1 | * | 2/2003 | Eckert et al. | 73/861.357 |
| 6,651,513 | B1 | * | 11/2003 | Wenger et al. | 73/861.357 |

OTHER PUBLICATIONS

Storm et al., 'Model-Based Correction of Coriolis Mass Flowmeters', Aug. 2002, IEEE Publication, vol. 51, No. 4, pp. 605-610.*
Hirnschrodt et al., 'Time Domain Evaluation of Resonance Antireflection (RAR) Signals for Ultrasonic Density Measurement', Nov. 2000, IEEE Publication, vol. 47, No. 6, pp. 1530-1539.*

\* cited by examiner

*Primary Examiner*—Marc S. Hoff
*Assistant Examiner*—Elias Desta
(74) *Attorney, Agent, or Firm*—John F. McKenna; Cesari & McKenna, LLP

(57) ABSTRACT

A Coriolis mass flowmeter incorporates at least one measuring tube, at least one oscillator for the excitation of the measuring tube and at least one oscillation detector for registering the oscillations of the measuring tube, with an activator serving to energize the oscillator, at least one evaluation unit serving to analyze the oscillations registered by the oscillation detector, an excitation signal path including excitation signal-path devices provided between the activator and the oscillator for transmitting an excitation signal, and a measuring signal path with measuring signal-path devices provided between the oscillation detector and the evaluation unit for transmitting the measuring signal. A control signal path with at least one control signal path device is provided, the control signal path directly connecting the excitation signal path to the evaluation unit, whereby the excitation signal that passed through at least one excitation signal path device is fed as a control signal, via the control signal path, to the evaluation unit, with the control signal path device in the control signal path corresponding to a measuring signal path device. This permits the correction of the measuring signal, received via the measuring signal path, with the aid of the control signal received by the evaluation unit via the control signal path, the result being improved measuring accuracy. A method of operating such a flowmeter is also disclosed.

14 Claims, 2 Drawing Sheets

CORIOLIS MASS FLOWMETER AND METHOD FOR OPERATING A CORIOLIS MASS FLOWMETER

BACKGROUND OF THE INVENTION

This invention relates to a Coriolis mass flowmeter incorporating at least one measuring tube, at least one oscillator for the excitation of the measuring tube and at least one oscillation detector for registering the oscillations of the measuring tube, with an activator serving to energize the oscillator, at least one evaluation unit serving to analyze the oscillations registered by the oscillation detector, an excitation signal path including excitation signal-path devices provided between the activator and the oscillator for transmitting an excitation signal, and a measuring signal path with measuring signal-path devices provided between the oscillation detector and each evaluation unit for transmitting a measuring signal.

The invention further relates to a method for operating a Coriolis mass flowmeter, which Coriolis mass flowmeter incorporates at least one measuring tube, at least one oscillator for the excitation of the measuring tube and at least one oscillation detector for registering the oscillations of the measuring tube, whereby the energizing of the oscillator takes place by means of an activator, the analysis of the oscillations registered by the oscillation detector is performed by an evaluation unit, an excitation signal is transmitted by the activator to the oscillator via an excitation signal path featuring excitation signal-path devices, and a measuring signal is transmitted by the oscillation detector to the evaluation unit via a measuring signal path featuring measuring signal-path devices.

The above-described Coriolis mass flowmeter design and method for operating a Coriolis mass flowmeter address the type of conventional Coriolis mass flowmeters and method for operating such mass flowmeters in which one or two oscillators serve to excite the measuring tube and the mass flow is measured on the basis of a phase difference, typically determined by means of two oscillation detectors, between the oscillations of the measuring tube at mutually separate points. To that effect, the activator feeds an excitation signal to one or two oscillators via the excitation signal path featuring signal-path devices such as digital-to-analog converters and signal conditioners such as amplifiers. The measuring tube is caused to oscillate and, typically, by means of two oscillation detectors the oscillations of the measuring tube are registered, in which process the Coriolis oscillation derived from the medium flowing through the measuring tube is superimposed over the energizing oscillation, thus permitting mass flow measurements.

For the actual mass flow measurement the measuring signals registered typically by two oscillation detectors are fed, via a measuring signal path featuring measuring signal-path devices such as analog/digital converters and signal conditioners such as amplifiers, to the evaluation unit which may be physically identical to the activator. The resulting signal progression is as follows: the excitation signal travels along the excitation signal path—of which the oscillator is a part—to the measuring tube; by virtue of its interaction with the measuring tube, i.e. by causing the measuring tube to oscillate and registering the resulting oscillation that is also modulated by the Coriolis oscillation thus generated, the excitation signal becomes the measuring signal; the measuring signal registered by the oscillation detectors then travels along the measuring signal path—of which the oscillators are a part—to an evaluation unit.

Coriolis mass flowmeters with one oscillator require at least one maximally precise signal phase measurement. Errors affecting the precision of the phase measurement are caused by the inconsistent effect of the measuring signal-path devices on the measuring signal, including, for instance, the extent to which the measuring signal-path devices affect the measuring signal as a function of the prevailing temperature. In other words, a Coriolis mass flowmeter that was calibrated at a particular temperature will produce incorrect readings of the phase difference between two oscillation detectors when its operating temperature differs from that calibrating temperature.

In the case of Coriolis mass flowmeters equipped with two oscillators by means of which the measuring tube is to be energized in different oscillating modes, the situation is even more complicated. The excitation signals as well as the measuring signals must be transmitted with maximum amplitude and phase accuracy. Consequently, errors that can negatively affect amplitude and/or phase accuracy may originate in both the excitation signal-path devices and the measuring signal-path devices.

SUMMARY OF THE INVENTION

It is therefore the objective of this invention to introduce a Coriolis mass flowmeter as well as a method for operating such a Coriolis mass flowmeter by means of which the highest possible measuring accuracy is attainable.

Based on the Coriolis mass flowmeter design described above, this objective is achieved in that a control signal path with at least one control signal-path device is provided, which control signal path establishes a direct connection between the excitation signal path and an evaluation unit, whereby the excitation signal traveling through a minimum of one excitation signal-path device serves as the control signal that is fed to the evaluation unit via the control signal path, while the control signal-path device provided in the control signal path corresponds to a measuring signal-path device.

Thus, as an essential feature of this invention, the control signal path connects the excitation signal path directly to the evaluation unit and the excitation signal passing through the minimum of one excitation signal-path device becomes the control signal that is fed along the control signal path to the evaluation unit. As a particular aspect of the fact that the control signal path connects the excitation signal path directly to the evaluation unit, there is no interaction between the measuring tube and the signal that is fed back to the evaluation unit via the control signal path, so that, because the control signal-path device provided in the control signal path corresponds to a measuring signal-path device, the measuring signal can be corrected with the aid of the control signal so as to compensate for any inconsistent conditions of the excitation signal devices and the measuring signal devices as a function of extraneous parameters such as temperature.

As a result, amplitude and phase measurements especially can be performed with greater accuracy.

As a particular option in a preferred embodiment of the invention, the control signal path includes at least one oscillation detector, one amplifier and/or one analog/digital converter whenever a corresponding oscillation detector, amplifier and/or analog/digital converter is provided in the measuring signal path. In a preferred design enhancement of the invention, a multiplicity of measuring signal-path devices in the measuring signal path are, in each case, matched by corresponding control signal-path devices. The fact that, as intended by this invention, a control signal path device corresponds to a measuring signal path device, means that the devices are essentially identical in design and are thus preferably of the same model and type with identical circuitry and connections. Finally, according to a preferred embodiment of the invention, all measuring signal path devices provided in the measuring signal path are correspondingly reflected in control signal path devices provided in the control signal path.

As an alternative to the preferred inventive implementation last mentioned, another preferred embodiment of the invention provides for the control signal path to be connected to the excitation signal path ahead of, and preferably directly in front of, the oscillator while the control signal path preferably remains without an oscillation detector. This simplifies the layout of the control signal path while still permitting correction of the effect of the oscillator or oscillation detector on the excitation signal either by an assumed constant state or preferably with the aid of a model that responds in specific fashion to an extraneous parameter such as the temperature.

In principle, the Coriolis mass flowmeter according to this invention may be equipped with one oscillator only. However, in a preferred embodiment of the invention, the Coriolis mass flowmeter features two oscillators, each with its associated excitation signal path connecting the oscillator with its activator to the respective excitation signal path and with a multiplexer that connects to the control signal path, which multiplexeralternately activates the control signal path for one or the other of the excitation signal paths. It is also possible to design the excitation signal path along a dual-channel concept. The latter would always be a preferred choice when the interference time constants are of a magnitude where discontinuous acquisition of the interferences by activating the control signal path for one or the other of the channels of the excitation signal path will suffice. One advantage associated with this preferred embodiment of the invention lies in the fact that, notwithstanding the presence of two oscillators, the control signal path can be designed along a single-channel concept, thus reducing the cost of the equipment.

In an alternative, preferred embodiment of the invention, the Coriolis mass flowmeter encompasses two oscillators, each with an excitation signal path that connects the oscillator concerned to the activator, as well as two control signal paths, each with a fixed connection to one of the excitation signal paths. Due to the fixed connection of the control signal paths to a respective excitation signal path, there will always be an active control signal path available for each excitation signal path, thus permitting the continuous acquisition of the control signals. This also allows for adequate compensation for rapidly changing interference effects.

Based on the above-described method for operating a Coriolis mass flowmeter, the aforementioned objective is achieved in that a control signal path is provided with at least one control signal path device, with the control signal path connecting the excitation signal path directly with the evaluation unit, whereby the excitation signal that travels through the minimum of one excitation signal path device serves as the control signal and is fed via the control signal path to the evaluation unit, with the control signal path device provided in the control signal path corresponding to a measuring signal path device.

In this case as well, the control signal path device provided in the control signal path corresponds to a measuring signal path device, and the control signal path device and the measuring signal path device are essentially identical and feature identical circuitry and connections. According to a preferred embodiment of the invention, this makes it possible for the measuring signal received by the evaluation unit via the measuring signal path to be corrected by means of the control signal received by the evaluation unit via the control signal path. The less the control signal path device differs from the appropriate measuring signal path device, the better the correction will be, meaning that optimal correction would be achieved if the control signal path device and the measuring signal path device were to be absolutely identical. Moreover, here as well, the control signal path is connected directly to the excitation signal path without any interaction with the measuring tube.

Correcting the measuring signal received via the measuring signal path with the aid of the control signal that is received by the evaluation unit by way of the control signal path and is unaffected by the oscillatory excitation of the measuring tube, thus makes it possible to compensate for inconstant conditions of the excitation signal path devices and measuring signal path devices, with the resulting improvement in amplitude and phase accuracy ultimately yielding greater measuring accuracy.

It is entirely possible for the correction of the measuring signal received via the measuring signal path, achieved with the aid of the control signal received by the evaluation unit by way of the control signal path, to be adequate especially if and when all measuring signal path devices present in the measuring signal path match the control signal path devices in the control signal path or when matching control signal path devices are omitted only for those measuring signal path devices that can be expected to exhibit essentially constant conditions even when extraneous parameters such as the temperature are subject to change. In a preferred embodiment of the invention, however, the measuring signal is corrected not only by means of the control signal received by the evaluation unit via the control signal path but also with the aid of a model. As a particular feature in a preferred embodiment of the invention, the model compensates for the theoretical effect of at least one, of the excitation signal path devices bypassed by the excitation signal received by the evaluation unit via the control signal path, and/or of at least one measuring signal path device for which no corresponding control signal path device is provided, on the control signal received by the evaluation unit via the control signal path.

For example, the control signal path may be connected to the excitation signal path ahead of the oscillator while not being equipped with an oscillation detector, in which case the effect of the oscillator and oscillation detector—for instance as a function of the temperature—is compensated for with the aid of a formula that reflects the effect of the oscillator and/or oscillation detector.

This method for operating a Coriolis mass flowmeter is basically employable with Coriolis mass flowmeters having only one oscillator. According to a preferred embodiment of the invention, however, two oscillators are provided, each with an excitation signal path that connects the respective oscillator to the activator and with a multiplexer that is connected to the excitation signal paths and to the control signal path, which multiplexer alternatingly activates the control signal path for one or the other of the excitation signal paths.

According to another, alternative preferred embodiment of the invention, two oscillators may be provided, each with an excitation signal path that connects the oscillator concerned to the activator and with two control signal paths individually in fixed connection to one of the excitation signal paths, thus permitting continuous real-time compensatory action of the control signal paths.

There are numerous specific ways in which the Coriolis mass flowmeter according to this invention and the correspondingly novel method for operating a Coriolis mass flowmeter can be designed and implemented. To that effect, attention is invited to the dependent claims, to the attached drawings and to the following detailed description of preferred embodiment of this invention.

DETAILED DESCRIPTION OF ILLUSTRATIVE EMBODIMENTS

Figure 1:
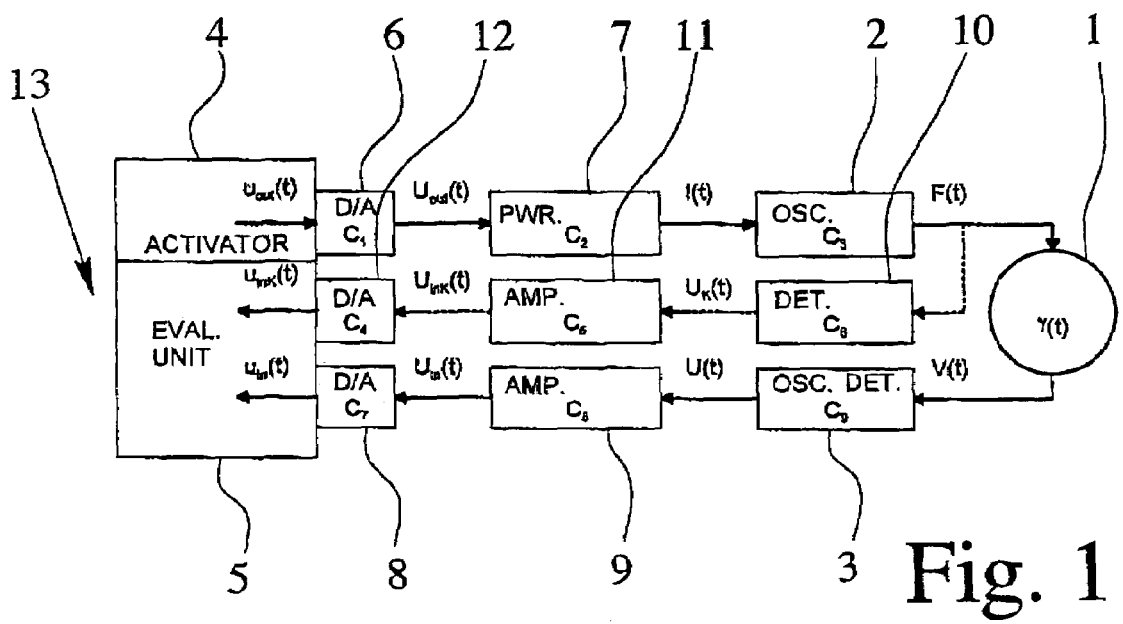
FIG. 1 is a schematic diagram of a Coriolis mass flowmeter with an excitation signal path, a measuring signal path and a control signal path in a first preferred embodiment of the invention.

FIG. 1 is a schematic illustration of a Coriolis mass flowmeter according to a first preferred embodiment of the invention. The Coriolis mass flowmeter according to this first preferred embodiment incorporates a measuring tube 1 that is energized and caused to oscillate by way of a dual-channel excitation signal path terminating in two oscillators 2. The resulting oscillations of the measuring tube 1 through which travels a flowing medium are registered by two oscillation detectors 3.

An activator 4 serves to activate the oscillators 2 via the excitation signal path while an evaluation unit 5 is provided for analyzing the oscillations of the measuring tube 1 sensed by the oscillation detectors 3, with the activator 4 and the evaluation unit 5 being physically unitized into an activating and evaluation system 13. The dual-channel excitation signal path includes multiple excitation signal path devices, these being digital/analog converters 6, power sources 7 and the aforementioned oscillators 2 for energizing the measuring tube 1. The measuring signal path, itself of a dual-channel design, includes multiple measuring signal path devices, these being analog/digital converters 8, amplifiers 9 and the aforementioned oscillation detectors 3.

Operating the Coriolis mass flowmeter illustrated in FIG. 1 as the first preferred embodiment of the invention would, in principle, be possible even with the existing excitation signal path and measuring signal path. More particularly, by way of the excitation signal path, the measuring tube 1 can be caused to oscillate and by way of the measuring signal path, the oscillations of the measuring tube 1, containing the Coriolis oscillations, can be captured for the ultimate analysis in the evaluation unit 5.

However, in addition to the excitation signal path and the measuring signal path in the preferred embodiment of the invention here described, a control signal path, indicated in FIG. 1 by a dashed outline, is provided that connects directly to the excitation signal path and is likewise designed along the dual-channel concept. The control signal path devices in the control signal path closely correspond to the measuring signal path devices of the measuring signal path and include detectors 10 that correspond to the measuring signal path oscillation detectors 3, amplifiers 9 that correspond to the measuring signal path amplifiers 11, and analog/digital converters 12 that correspond to the measuring signal path analog/digital converters 8.

The system described above and illustrated permits a corrective process as explained below:

The measuring tube 1 exhibits a transmission pattern that can be expressed as a $\gamma(t)$ function. This $\gamma(t)$ function can be derived from the quotient of $$\gamma(t) = \frac{V(t)}{F(t)},$$

i.e. from the ratio of the measured oscillation pattern V(t) of the measuring tube 1 relative to its excitation F(t). In this context, it is essentially unimportant whether the method employed is based on a deflection in which the excitation F(t) remains constant, on a compensation in which the measured oscillation pattern V(t) of the measuring tube 1 remains constant, or on some combination thereof.

In the combined activating and evaluation system 13, composed of the activator 4 and the evaluation unit 5, only the internal signals $u_{out}(t)$ and $u_{in}(t)$ are known factors, i.e. the original excitation signal and the measuring signal that is fed to the evaluation unit 5 via the measuring signal path. With these signals the following formulas can be created:

$$F(t) = C_1 \cdot C_2 \cdot C_3 \cdot u_{out}(t)$$

and $$u_{in}(t) = C_7 \cdot C_8 \cdot C_9 \cdot V(t),$$

where, as can be seen in FIG. 1, the factors $C_1$, $C_2$, $C_3$, $C_7$, $C_8$ and $C_9$ represent the effect of the excitation signal path devices and the measuring signal path devices on the excitation signal and, respectively, on the measuring signal. However, in regular operation of the Coriolis mass flowmeter, these factors, hereinafter referred to as the transmission factors $C_1$, are typically not constant and are susceptible to changes over time, potentially leading to errors.

When the two real transmission paths, meaning the excitation signal path and the measuring signal path, are expressed as $$C_{out}(t) = C_{outN} \cdot f(t) = C_1(t) \cdot C_2(t) \cdot C_3(t)$$

$$C_{in}(t) = C_{outN} \cdot h(t) = C_7(t) \cdot C_8(t) \cdot C_9(t)$$

and consolidated into $$F(t) = C_{outN} \cdot f(t) \cdot u_{out}(t),$$

$$u_{in}(t) = C_{inN} \cdot h(t) \cdot V(t)$$

the transmission paths can be divided into nominally constant transmission factors $C_{outN}$ and $C_{inN}$ as well as interference functions f(t) and h(t). The nominal transmission factors are derived from the calibration of the Coriolis mass flowmeter. It is now possible, with the aid of the control signal path, to determine and eliminate or minimize the interference functions f(t) and h(t).

In other words, by means of the control signal path it is possible to monitor the entire significant signal path constituted of the excitation signal path and the measuring signal path, as explained in detail below.

The control signal path connects to the excitation signal path behind the oscillators 2, allowing the oscillation detectors 10 of the control signal path to register the level of excitation of the measuring tube 1. This produces for the control signal path an input signal $u_{inK}(t)$ with a value of $$u_{inK}(t)=C_4(t)\cdot C_5(t)\cdot C_6(t)\cdot F(t)=C_{inKN}\cdot g(t)\cdot F(t)$$

where $C_i$ represents the real transmission factors of the oscillation detectors 10, amplifiers 11 and analog/digital converters 12 of the control signal path, $C_{inKN}$ is a nominal transmission factor and $g(t)$ is an interference function. The input signal $u_{inK}$ can now be used for correcting the interference functions $f(t)$ and $h(t)$. The additional input signal is derived from the excitation at $$u_{inK}(t)=C_{inKN}\cdot g(t)\cdot F(t)=C_{inKN}\cdot g(t)\cdot C_{outN}\cdot f(t)\cdot u_{out}(t)$$

or, in the nominal case i.e. within the boundary conditions of the calibration, at $$u_{inKN}(t)=C_{inKN}\cdot F(t)=C_{inKN}\cdot C_{outN}\cdot u_{out}(t).$$

By introducing a corrective activation signal $$\tilde{u}_{out}(t) = u_{out}(t)\cdot \frac{u_{inKN}(t)}{u_{inK}(t)} = u_{out}(t)\cdot \frac{1}{f(t)\cdot g(t)},$$

the resulting excitation of the measuring tube 1 will be $$F(t) = C_{outN}\cdot f(t)\cdot \tilde{u}_{out}(t) = C_{outN}\cdot \frac{1}{g(t)}\cdot u_{out}(t)$$

independent of any interference in the excitation signal path $f(t)$. The interference function $g(t)$ in the excitation helps minimize the effect of the interference function $h(t)$. The actual area of interest is the transmission function of the measuring tube 1, hence $$\gamma(t) = \frac{V(t)}{F(t)} = \frac{1/C_{inN}\cdot 1/h(t)}{C_{outN}\cdot 1/g(t)}\cdot \frac{u_{in}(t)}{u_{out}(t)}.$$

Whenever the control signal path is largely identical to the measuring signal path, with the control signal path devices corresponding to the measuring signal path devices, the interference functions $g(t)$ and $h(t)$ will be essentially identical and the determination of the transmission pattern will be virtually error-free:

$$\gamma(t) = \frac{V(t)}{F(t)} = \frac{1}{C_{outN}\cdot C_{inN}}\cdot \frac{u_{in}(t)}{u_{out}(t)}.$$

Figure 2:
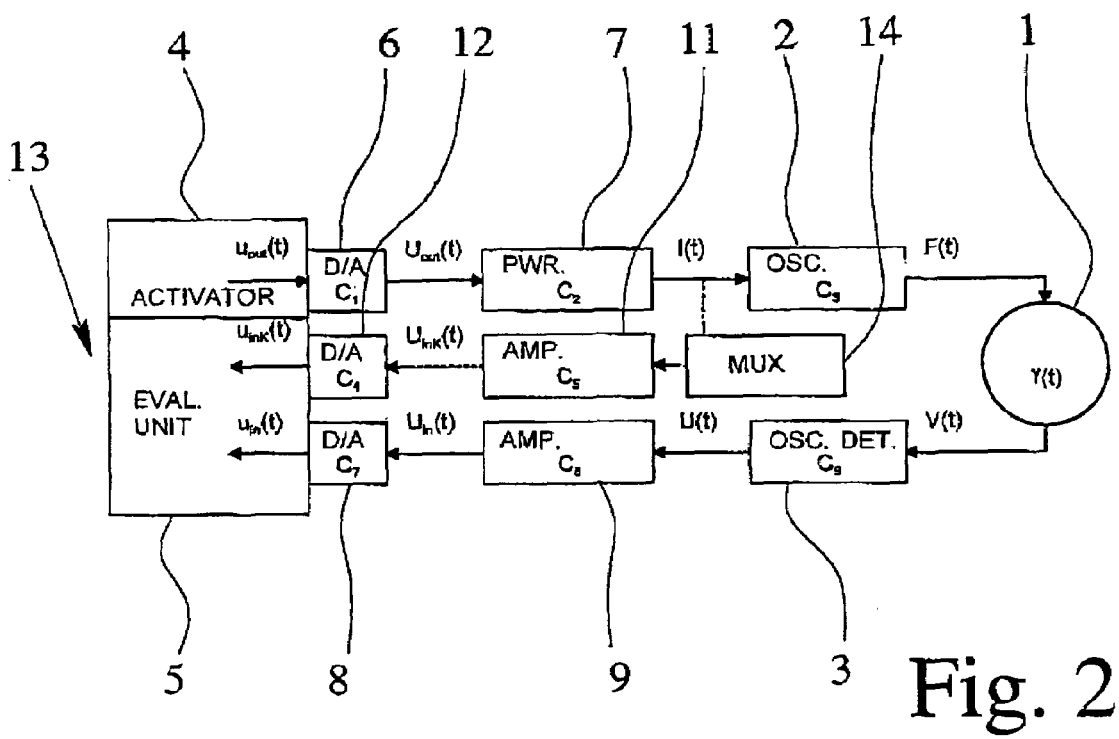
FIG. 2 is a schematic diagram of a Coriolis mass flowmeter with an excitation signal path, a measuring signal path and a control signal path in a second preferred embodiment of the invention.

When parts of the signal path, i.e. at least one excitation signal path device and/or one measuring signal path device, can be described reasonably well by means of a model, they can be removed from the monitoring function, meaning that corresponding control signal path devices can be dispensed with. This will significantly reduce the cost of the monitoring provisions. Apart from that, it is also possible even with a dual-channel excitation signal path and a dual-channel measuring signal path to provide a single-channel control signal path that is then activated in multiplex fashion for one channel at a time. A second preferred embodiment of a Coriolis mass flowmeter is configured accordingly, as described in detail below with reference to FIG. 2.

Since in the preferred embodiment of the invention here discussed the oscillators 2 and the oscillation detectors 3 are described by way of a proper model, the control signal path already connects to the excitation signal path ahead of the oscillators 2 and no oscillation detector is provided in the control signal path. In the case at hand, the control signal path is based on a single-channel concept only and, accordingly, only a single amplifier 11, corresponding to the amplifiers 9 of the measuring signal path, and only one single analog/digital converter 12, corresponding to the analog/digital converters 8 of the measuring signal path, are provided. The single-channel control signal path is activated in alternating fashion, by means of a multiplexer 14, for one channel of the excitation signal path at a time.

When high-performance electromagnetic drivers are used in the operating range of the Coriolis mass flowmeter, the transmission pattern of the oscillators 2 can be expressed for instance by the equation $$C_3(t)=C_{3N}\cdot[1+\alpha\cdot(T(t)-T_N)]$$

which represents the temperature response of the magnetic properties of a permanent magnet, with the temperature $T(t)$ of the magnets being obtained by way of the measurement of the medium in the Coriolis mass flowmeter while the parameters $\alpha$ and $T_N$ are determined through calibration. In analogous fashion, the transmission pattern of the two oscillation detectors 3 is described by way of the equation $$C_9(t)=C_{9N}\cdot[1+\beta\cdot(T(t)-T_N)].$$

At that point, the control signal path only monitors the digital/analog and analog/digital converters 6, 8 and the signal conditioners constituted of the power supplies 7 and the amplifiers 9. The result for the transmission function of the measuring tube will thus be $$\gamma(t) =$$

$$\frac{V(t)}{F(t)} = \frac{1/C_{inN}\cdot 1/h(t)}{C_{outN}\cdot 1/g(t)}\cdot \frac{1}{[1+\alpha(T(t)-T_N)]\cdot[1+\beta(T(t)-T_N)]}\cdot \frac{u_{in}(t)}{u_{out}(t)}.$$

The interference function $g(t)$ will now only contain the changes in the transmission factors $C_4$ and $C_5$ and the interference function $h(t)$ will contain only the changes in the transmission factors $C_7$ and $C_8$. As in the case of the above-described first preferred embodiment of the invention, an identical configuration of the appropriate measuring signal path devices and control signal path devices can create identical timing conditions in the measuring signal path and control signal path, i.e. in the control signal path devices corresponding to the monitored measuring signal path devices, the result being $$g(t)=h(t).$$

The determination of the transmission pattern of the measuring tube 1 can then be made virtually error-free by applying $$\gamma(t) = \frac{V(t)}{F(t)} = \frac{1}{C_{outN} \cdot C_{inN}} \cdot \frac{1}{[1 + \alpha(T(t) - T_N)] \cdot [1 + \beta(T(t) - T_N)]} \cdot \frac{u_{in}(t)}{u_{out}(t)}.$$

Figure 3:
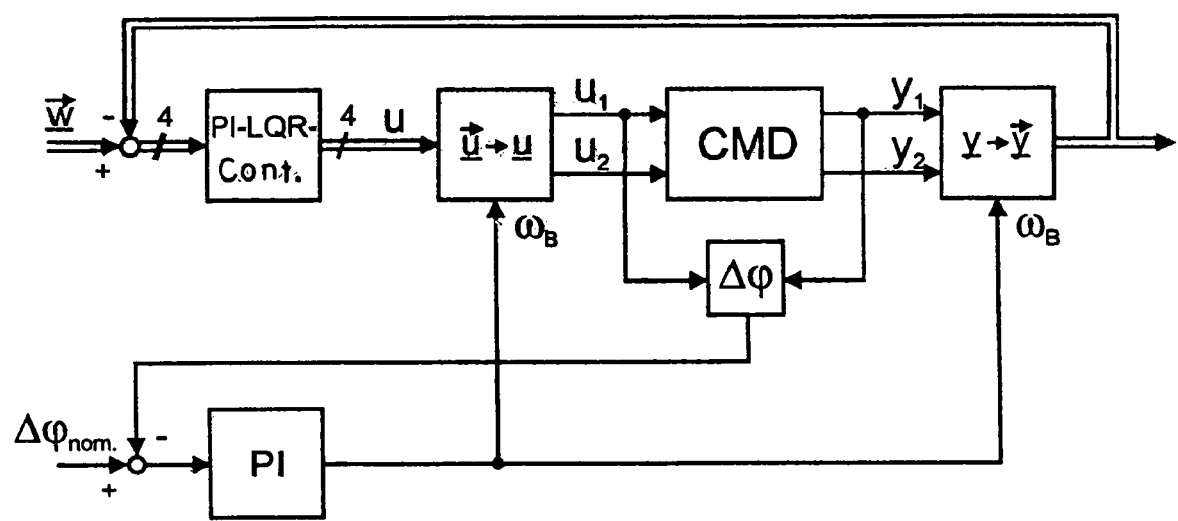
FIG. 3 is a block diagram implementing a control method employable in a Coriolis mass flowmeter equipped with two oscillators.

Finally, there follows in connection with FIG. 3 a description of how the operating-state control of a Coriolis mass flowmeter with two oscillators 2 can be optimized.

For controlling the oscillation pattern of the two oscillators 2, an optimized operating-state controller (LQR) is used, with phase expansion by each one I-fraction for the real and the imaginary part of the two manipulated variables. This produces a minor susceptibility to changes in extraneous parameters, in particular the mass flow and the operating frequency. In addition to consistent-phase tracking of the controlled variables y relative to the setpoint value w, an added cascade configuration will make it possible to adjust the operating frequency $\omega_B$ by means of a simple PI controller in such fashion that there will be a phase relation of 0 between the input variable $u_1$ of the first mode of the measuring tube 1 and the output variable $y_1$ of the first mode of the measuring tube 1. This assures operation of the Coriolis mass flowmeter at the resonance frequency of the first intrinsic mode $\omega_{01}$.

The invention claimed is:

1. A Coriolis mass flowmeter incorporating at least one measuring tube, at least one oscillator for the excitation of the measuring tube and at least one oscillation detector for registering the oscillations of the measuring tube, with an activator serving to energize the oscillator, at least one evaluation unit serving to analyze the oscillations registered by the oscillation detector, an excitation signal path including excitation signal-path devices provided between the activator and the oscillator for transmitting an excitation signal, and a measuring signal path with measuring signal-path devices provided between the oscillation detector and the evaluation unit for transmitting the measuring signal, the improvement wherein a control signal path with at least one control signal path device is provided, which control signal path connects the excitation signal path directly to the evaluation unit, whereby the excitation signal traveling through a minimum of one excitation signal path device is fed as a control signal, via the control signal path, to the evaluation unit, said control signal path device in the control signal path corresponding to a measuring signal path device.

2. The Coriolis mass flowmeter as in claim 1, wherein the control signal path includes at least one oscillation detector, one amplifier and/or one analog/digital converter.

3. The Coriolis mass flowmeter as in claim 1 or 2, wherein the control signal path connects to the excitation signal path ahead of and preferably directly in front of the oscillator of the excitation signal path.

4. The Coriolis mass flowmeter as in claim 1 or 2, wherein the control signal path does not include an oscillation detector.

5. A method for operating a Coriolis mass flowmeter of the type including at least one measuring tube, at least one oscillator for the excitation of the measuring tube and at least one oscillation detector for registering the oscillations of the measuring tube, an activator for energizing the oscillator, and at least one evaluator for analyzing the oscillations registered by the oscillation detector, said method comprising the steps of transmitting an excitation signal from the activator to the oscillator via an excitation signal path that includes excitation signal-path devices;

transmitting the measuring signal from the oscillation detector to the evaluation unit via a measuring signal path that includes measuring signal-path devices, and producing a control signal path with at least one control signal path device said control signal path connecting the excitation signal path directly to the evaluation unit, whereby the excitation signal traveling through at least one excitation signal path device is fed as a control signal, via the control signal path, to the evaluation unit, with said at least one control signal path device in the control signal path corresponding to a measuring signal path device.

6. The method as in claim 5, including the step of correcting, with the aid of the control signal received by the evaluation unit via the control signal path, the measuring signal received by the evaluation unit via the measuring signal path.

7. The method as in claim 6, wherein the measuring signal is additionally corrected with the aid of a model.

8. A Coriolis mass flowmeter incorporating at least one measuring tube, two oscillators for the excitation of the measuring tube and at least one oscillation detector for registering the oscillations of the measuring tube, with an activator serving to energize the oscillators, at least one evaluation unit serving to analyze the oscillations registered by the oscillations detector, two excitation signal paths including excitation signal-path devices, respectively, provided between the activator and the respective oscillator for transmitting an excitation signal, and a measuring signal path with measuring signal-path devices provided between the oscillation detector and the evaluation unit for transmitting the measuring signal, wherein a control signal path with at least one control signal path device is provided, which control signal path connects the excitation signal path directly to the evaluation unit, whereby the excitation signal traveling through a minimum of one excitation path device is fed as a control signal, via the control signal path, to the evaluation unit, said control path device in the control signal path corresponding to a measuring signal path device, and wherein a multiplexer is provided that connects to the excitation signal path and to the control signal paths said multiplexer alternatively activating the control signal path for one or the other excitation signal path.

9. A Coriolis mass flowmeter incorporating at least one measuring tube, two oscillators for the excitation of the measuring tube and at least one oscillation detector for registering the oscillations of the measuring tube, with an activator serving ing to energize the oscillator, at least one evaluation unit serving to analyze the oscillations registered by the oscillation detector, two excitation signal paths including excitation signal-path devices respectively provided between the activator and the respective oscillator for transmitting an excitation signal, and a measuring signal path with measuring signal-path devices provided between the oscillation detector and the evaluation unit for transmitting the measuring signal, wherein two control signal paths with at least one control signal path device, respectively, are provided, which control signal paths each connect one of the excitation signal paths directly to the evaluation unit, whereby the excitation signal traveling through a minimum of one excitation signal path device is fed as a control signal, via the control signal paths, to the evaluation unit, said control signal path device in the control signal paths corresponding to a measuring signal path device, respectively.

10. A method for operating a Coriolis mass flowmeter of the type including at least one measuring tube, at least one oscillator for the excitation of the measuring tube and at least one oscillation detector for registering the oscillations of the measuring tube, an activator for energizing the oscillator, and at least one evaluator for analyzing the oscillations registered by the oscillation detector, said method comprising the steps of transmitting an excitation signal from the activator to the oscillator via an excitation signal path that includes excitation signal-path devices; transmitting the measuring signal from the oscillation detector to the evaluation unit via a measuring signal path that includes measuring signal-path devices, and producing a control signal path with at least one control signal path device, said control signal path connecting the excitation signal path directly to the evaluation unit, whereby the excitation signal traveling through at least one excitation signal path device is fed as a control signal, via the control signal path, to the evaluation unit, with said at least one control signal path device in the control signal path corresponding to a measuring signal path device, wherein the measuring signal is additionally corrected with the aid of a model, and the model compensates for the theoretical effect, on the control signal received by the evaluation unit via the control signal path, of at least one excitation signal path device which is bypassed by the excitation signal received by the evaluation unit via the control signal path, and/or for at least one of the measuring signal path devices for which no corresponding control signal path device has been provided.

11. The method as in claim 10, wherein the model compensates for the theoretical effect on the control signal as a function of at least one extraneous parameter such as the temperature.

12. The method as in claim 10 or 11, including the step of compensating, with the aid of the model, for the theoretical effect of the oscillator and/or of the oscillation detector on the control signal.

13. The method as in one of the claims 10 or 11, including the step of providing two oscillators, each with an excitation signal path connecting the respective oscillator to the activator, and a multiplexer that connects to the excitation signal paths and to the control signal path, said multiplexer alternately activating the control signal path for one or the other of the excitation signal paths.

14. The method as in one of the claims 10 or 11, including providing two oscillators, each with an excitation signal path connecting the respective oscillator to the activator, and two control signal paths, respectively, in individual fixed connection with one of the excitation signal paths.

* * * * *